(12) United States Patent
Frazier

(10) Patent No.: US 8,312,054 B2
(45) Date of Patent: Nov. 13, 2012

(54) DATA MANAGEMENT SYSTEM, METHOD, AND SOFTWARE

(75) Inventor: Virginia G. Frazier, Cape Coral, FL (US)

(73) Assignee: Deva Industries, Inc., Cape Coral, FL (US)

( * ) Notice: Subject to any disclaimer, the term of this patent is extended or adjusted under 35 U.S.C. 154(b) by 597 days.

(21) Appl. No.: 12/371,718

(22) Filed: Feb. 16, 2009

(65) Prior Publication Data

US 2009/0210432 A1 Aug. 20, 2009

Related U.S. Application Data

(60) Provisional application No. 61/030,094, filed on Feb. 20, 2008.

(51) Int. Cl.
*G06F 7/00* (2006.01)
*G06F 17/30* (2006.01)

(52) U.S. Cl. ........................................................ 707/802
(58) Field of Classification Search .................. 707/802, 707/999.107
See application file for complete search history.

(56) References Cited

U.S. PATENT DOCUMENTS

| | | | |
|---|---|---|---|
| 5,675,745 A | 10/1997 | Oku et al. | |
| 6,023,572 A | 2/2000 | Lautzenheiser et al. | |
| 7,149,698 B2 * | 12/2006 | Guheen et al. | 705/319 |
| 2002/0052954 A1 * | 5/2002 | Polizzi et al. | 709/225 |
| 2002/0091621 A1 * | 7/2002 | Conklin et al. | 705/37 |
| 2002/0147626 A1 | 10/2002 | Zagotta et al. | |
| 2002/0173973 A1 * | 11/2002 | Cirinna et al. | 705/1 |
| 2003/0061223 A1 * | 3/2003 | Houston et al. | 707/100 |
| 2003/0083922 A1 | 5/2003 | Reed | |
| 2003/0110070 A1 | 6/2003 | De Goeij | |
| 2003/0171941 A1 | 9/2003 | Kraenzel et al. | |
| 2003/0220825 A1 | 11/2003 | Tseng | |
| 2004/0002885 A1 | 1/2004 | Levy | |
| 2004/0054545 A1 | 3/2004 | Knight | |
| 2004/0093234 A1 | 5/2004 | Bondi et al. | |
| 2004/0225549 A1 | 11/2004 | Parker et al. | |
| 2004/0267595 A1 * | 12/2004 | Woodings et al. | 705/9 |
| 2005/0015362 A1 * | 1/2005 | Ostertag et al. | 707/3 |
| 2005/0086257 A1 * | 4/2005 | Wright | 707/103 R |
| 2005/0108260 A1 * | 5/2005 | Wenn et al. | 707/100 |
| 2005/0137903 A1 | 6/2005 | Storms et al. | |
| 2006/0059253 A1 * | 3/2006 | Goodman et al. | 709/223 |
| 2006/0184410 A1 * | 8/2006 | Ramamurthy et al. | 705/8 |
| 2006/0241992 A1 | 10/2006 | Yaskin et al. | |
| 2006/0271568 A1 * | 11/2006 | Balkir et al. | 707/100 |
| 2007/0198317 A1 | 8/2007 | Harthcryde et al. | |
| 2007/0234508 A1 * | 10/2007 | Edwards | 16/42 R |
| 2007/0239508 A1 * | 10/2007 | Fazal et al. | 705/8 |
| 2007/0271517 A1 * | 11/2007 | Finkelman et al. | 715/742 |
| 2008/0077419 A1 | 3/2008 | Santiago et al. | |
| 2008/0126173 A1 * | 5/2008 | Crysel et al. | 705/10 |

* cited by examiner

*Primary Examiner* — Robert Beausoliel, Jr.
*Assistant Examiner* — Nicholas Allen
(74) *Attorney, Agent, or Firm* — Fraser Clemens Martin & Miller LLC; J. Douglas Miller

(57) ABSTRACT

A data management system and method for updating and aligning a plurality of management components, wherein the data management system is accessible to various users from a remote location, is disclosed. The data management system includes a user system having a web browser, a database including a plurality of management components for storing information related to a client group, and a server system in communication with the user system and the database, wherein the server system includes a change management component adapted to manage information stored on the database and dynamically update each of the management components when information stored on the database is modified.

20 Claims, 1 Drawing Sheet

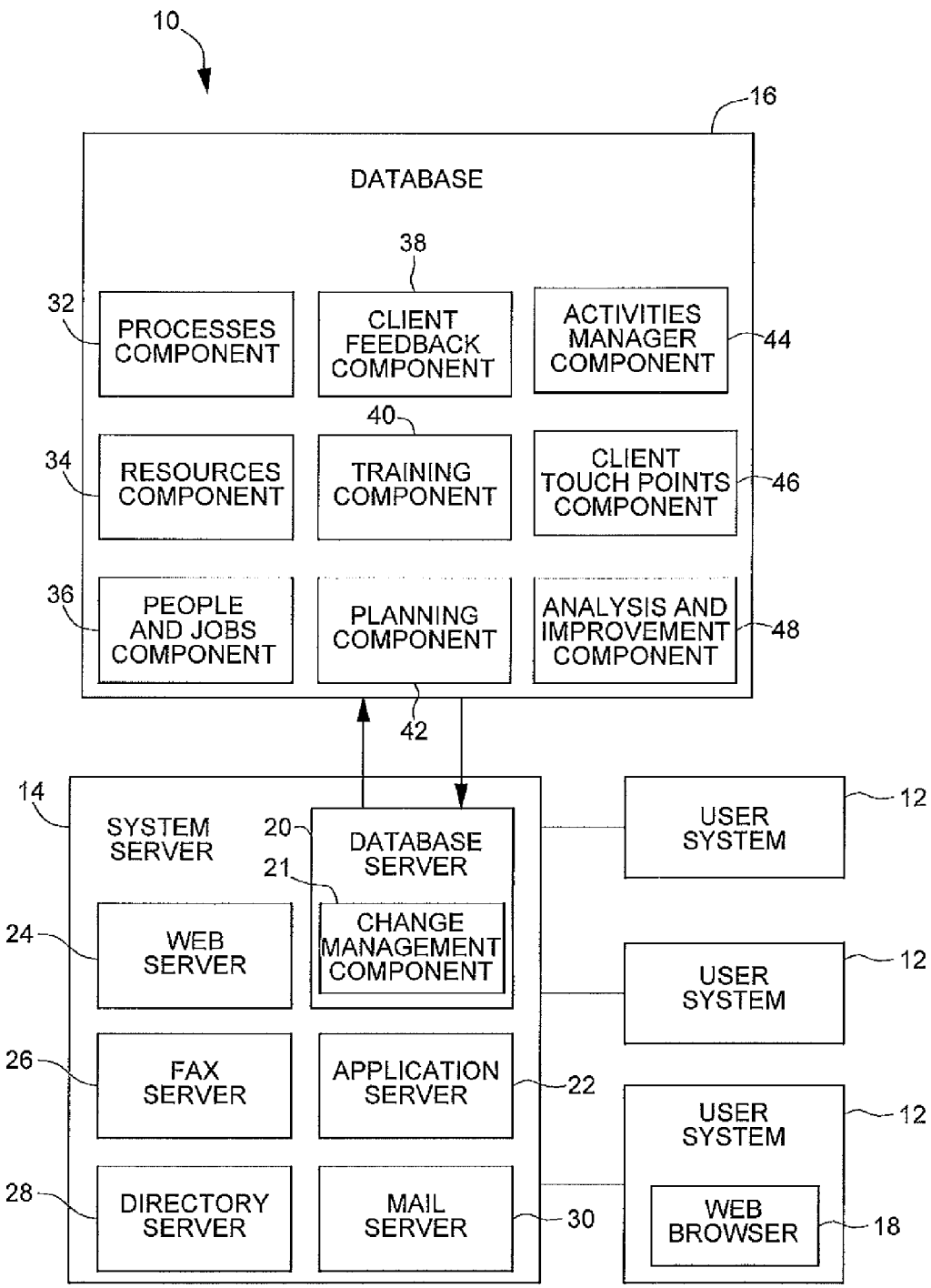

DATA MANAGEMENT SYSTEM, METHOD, AND SOFTWARE

CROSS-REFERENCE TO RELATED APPLICATION

This application claims the benefit of U.S. Provisional Patent Application No. 61/030,094 filed on Feb. 20, 2008.

FIELD OF THE INVENTION

The present invention relates to data management. More particularly, the invention is directed to a data management system and method for updating and aligning a plurality of management components.

BACKGROUND OF THE INVENTION

Managing the resources and processes of a business or organization often requires a detailed plan of action. As the plan of action is applied, the business may dynamically change its operations, resources available to the business may change, and members of the organization may be added or removed, for example. In order to maintain a useful and efficient management of the resources and processes of the business, the plan of action must continuously be modified and updated. Various problems arise when active members of the business are not available to continually update the plan of action. A lack of real-time feedback and dynamic updating often leads to an ineffective and inefficient management of company resources and personnel.

It would be desirable to have a data management system and method for updating and aligning a plurality of management components in real-time, wherein the data management system is accessible to various users from a remote location.

SUMMARY OF THE INVENTION

Concordant and consistent with the present invention a data management system and method for selectively updating and aligning a plurality of management components in real-time, wherein the data management system is accessible to various users from a remote location, has surprisingly been discovered.

In one embodiment, a data management system comprises a user system having a web browser, a database including a plurality of management components for storing information related to a client group, a server system in communication with the user system and the database, wherein the server system includes a change management component adapted to manage information stored on the database and dynamically update each of the management components when information stored in the database is modified.

In another embodiment, an article comprises a computer read-able signal-bearing medium, a means in the medium for managing information stored on an interconnected database, and a means in the medium for dynamically updating a plurality of components of the database when information of the database is modified.

The invention also provides methods for updating and aligning a plurality of management components in real-time.

One method comprises the steps of providing a user system having a web browser, providing a database including a plurality of management components for storing information related to a client group, providing a server system in communication with the user system and the database, wherein the server system includes a change management component adapted to manage information stored on the database, accessing the server system through the web browser of the user system, modifying the information stored on the database, and updating the information stored on the management components of the database.

BRIEF DESCRIPTION OF THE DRAWINGS

The above, as well as other advantages of the present invention, will become readily apparent to those skilled in the art from the following detailed description of the preferred embodiment when considered in the light of the accompanying FIGURE showing a schematic diagram of a data management system according to an embodiment of the present invention.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Referring to the FIGURE there is illustrated a data management system 10 according to an embodiment of the present invention. The data management system 10 includes a user system 12, a server system 14, and a database 16.

The user system 12 is adapted to transfer data between the user system 12 and the server system 14. The user system 12 is interconnected to the server system 14 through at least one of a private intranet, a public internet, a local area network (LAN), a dial-up-connection, a cable modem, and a high speed ISDN line, for example. Other network devices may be used to interconnect the user system 12 and the server system 14 such as a wireless network, for example. In one embodiment, the user system 12 is a computer including a web browser 18 and adapted for data transfer between the user system 12 and the server system 14. The web browser 18 may be any browser for providing remote user access to the server system 14. It is understood that the user system 12 may be any user access device capable of interconnecting to the server system 14 such as a web-capable mobile phone, a personal digital assistant (PDA), and other mobile electronic devices, for example. It is further understood that the user system 12, may include any number of user access devices, as desired. Any number of user systems 12 may be interconnected to the server system 14, as desired.

The server system 14 includes a database server 20. The database server 20 is adapted to manage data stored in the database 16 and interconnections between the database 16 and various resources not stored on the database 16. The database server 20 may also be adapted to perform operations such as, a user query, a data transfer, a data retrieval, and a data processing, for example. It is understood that other devices may be used to manage the data stored in the database 16 such as a software engine and a software package, for example. As shown, the database server 20 includes a change management component 21 interconnected to the database 16. Specifically, the change management component 21 is adapted to provide user access to database 16. The change management component 21 provides a means for user implemented modification to data and information in the database 16. The change management component 21 is further adapted to automatically modify and update a plurality of components 32, 34, 36, 38, 40, 42, 44, 46, 48 of the database, as changes are implemented to the database 16 and the interconnected components 32, 34, 36, 38, 40, 42, 44, 46, 48. It is understood that the change management component 21 may be a software package, a software engine, and other programmable device, as desired. It is further understood that the interconnection of each the components 32, 34, 36, 38, 40, 42, 44, 46, 48 may be modified in order to control a desired update procedure.

The server system 14 may further include an application server 22, a web server 24, a fax server 26, a directory server 28, and a mail server 30, known in the art. As a non-limiting example: the application server 22 hosts an application programming interface (API) to expose business logic and business processes for use by third-party applications and software; the web server 24 is responsible for accepting Hypertext Transfer Protocol (HTTP) requests from clients (user agents such as the web browser 18) and returning HTTP responses along with optional data contents including web pages such as HyperText Markup Language (HTML) documents and linked objects (images, etc.); the fax server 26 includes one or more fax-capable modems (or dedicated fax boards) in communication with a telephone or internet protocol (IP) network to accept documents from users, convert them into faxes, and transmit them, as well as to receive fax calls and either store the incoming documents or pass them on to users; the directory server 28 stores, organizes, and provides access to information in a plurality of directories; and the mail server 30 is a mail transfer agent for transferring electronic mail messages from one system to another. It is understood that the change management component 21 of the database server 20 may be interconnected to the mail server 30 for sending e-mail updates to the client system 12. It is further understood that the server system 14 may include additional servers, components, and software packages, as desired.

The database 16 is in data communication with the database server 20 according to an embodiment of the present invention. The database 16 is adapted to store information in an electronic medium. The database 16 includes a processes component 32, resources component 34, a people and jobs component 36, a client feedback component 38, a training component 40, a planning component 42, an activities manager component 44, a client touchpoints component 46, and an analysis and improvement component 48. The components 32, 34, 36, 38, 40, 42, 44, 46, 48 of the database are interconnected to update and transfer data, as desired. It is understood that the database 16 may include other components, as desired.

The processes component 32 includes operational process information related to the operations of a particular company, business, organization, or entity, collectively referred to as a client group. It is understood that any number of operational process may be included, as desired. The data and information of the processes component 32 is adapted to be managed and modified by the change management component 21 of the database server 20. It is understood that each operational process of the processes component 32 may included a plurality of process details such as a time and cost detail, a Knowledge, Skill and Performance (KSP) standard, and a Strengths, Weaknesses, Opportunities, Threats (SWOT) detail, for example. Other process details may be included, as desired.

The resources component 34 includes a plurality of organizational resources such as measures, forms, contacts, disaster recovery procedures, documents, letters, policy, records, reports, regulations, and performance standards, for example. The resources components 34 may include other organizational resources, as desired. It is understood that the data and information of the resources component 34 is adapted to be managed and modified by the change management component 21 of the database server 20. It is further understood that the organizational resources of the resources component 34 may be stored outside the database 16 and interconnected to the resources component 34 for user access and management.

The people and jobs component 36 includes information related to a plurality of job titles and members of the client group. Specifically, members of the client group each have a specific job title associated with their position in the client group. The people and jobs component 36 is interconnected to the process component 32. Each job title includes a designated swimlane for organizing and identifying a member's responsibilities. Specifically, the people and jobs component 36 includes information related to each process of the process component 32 for which particular members are responsible.

The client feedback component 38 is adapted to generate custom surveys based upon information in the components 32, 34, 36, 38, 40, 42, 44, 46, 48 of the database 16. It is understood that the client feedback component 38 may be adapted to transmit the custom survey to a desired component or system.

The training component 40 is adapted to retrieve information from various components 32, 34, 36, 38, 42, 44, 46, 48 of the database 16 and assemble the information into a desired training output. It is understood that the training output may include an index of resources and links to information regarding operation process and the improvement thereof. It is further understood that the training component 40 may also be adapted to transmit information and data to the components 32, 34, 36, 38, 42, 44, 46, 48 of the database 16. As a non-limiting example, the training component 40 is interconnected with the people and jobs component 36 for updating and identifying each of the members's training status and the activities manager component 44 for scheduling and tracking trainings. As another example, the training component 40 may be interconnected to a process detail of the processes component 32 such as the KSP standards, for example.

The planning component 42 is adapted to retrieve information from various components 32, 34, 36, 38, 40, 44, 46, 48 of the database 16 and assemble the information into a desired planning output. It is understood that the planning output may include an index of resources and links to information regarding goals, objectives, budgets, and the improvement thereof. It is further understood that the planning component 42 may also be adapted to transmit information and data to the components 32, 34, 36, 38, 40, 44, 46, 48 of the database 16. As a non-limiting example, the planning component 42 is interconnected to the SWOT detail of the processes component 32 to provide real-time planning.

The activities manager component 44 is adapted to retrieve information from various components 32, 34, 36, 38, 40, 42, 46, 48 of the database 16 and assemble the information into a calendar output. It is understood that additional output formats such as workflow management output and Gantt output, for example. It is further understood that the activities manager component 44 may also be adapted to transmit information and data to the other components 32, 34, 36, 38, 40, 42, 46, 48 of the database 16.

The client touchpoints component 46 includes information related to communication with a particular client group. The client touchpoints component 46 is interconnected to the processes component 32 to identify the specific process of the processes component 32 that are related to the particular client group.

The analysis and improvement component 48 is adapted to provide a plurality of utilities for streamlining the overall operation of the company, business, organization, or entity. The analysis and improvement component 48 is interconnected with the other components 32, 34, 36, 38, 40, 42, 44, 46 of the database 16 and adapted to transmit and receive data and information. As a non-limiting example, the analysis and improvement component 48 assembles information from the other components 32, 34, 36, 38, 40, 42, 44, 46 of the database 16, analyzes the information based upon pre-defined standards such as efficiency standards, training standards, client feedback standards, root cause analysis, and cost-benefit analysis. As another example, the analysis and improvement component 48 is interconnected to a measure of the resources component 34 to provide real-time analysis of a particular process or operation based upon a pre-defined standard. It is understood that the utilities and standards of the analysis and improvement component 48 may be defined by the client group or by a third-party.

In use, a user remotely connects to the server system 14 through the web browser on at least one user system 12. The user system 12 provides remote access to the applications and servers of the server system 14. Specifically, the user may access, manage, modify, retrieve, and process data stored on the database through the database server 20. It is understood that the database server 20 may be adapted to provide other functions, as desired. It is further understood that a software engine, a software package, or other servers may be used independently or in cooperation to provide similar functions as the database server 20. In one embodiment, the change management component 21 of the database server 20 is pre-programmed to access and manage the information of the database 16. The user may selectively retrieve, display, and modify information in the resources component 34 and the processes component 32 through the change management component 21. It is understood that other components may be adapted to provide user access to the components 32, 34, 36, 38, 40, 42, 44, 46, 48 of the database 16. Where the user modifies the information stored in the resources component 34 and the processes component 32, the database server 20 automatically updates the other components 32, 34, 36, 38, 40, 42, 44, 46, 48 of the database 16. The database server 20 is adapted to modify the information on each of the components 32, 34, 36, 38, 40, 42, 44, 46, 48 when a user modifies the information of an interconnected component 32, 34, 36, 38, 40, 42, 44, 46, 48. Specifically, where a user modifies a process of the processes component 32, the information of the people and jobs component 36 is updated and modified by the database server 20. The automatic update reflects any changes to the swimlanes associated with job titles. It is understood that the other components 32, 34, 36, 38, 40, 42, 44, 46, 48 are modified by the database server 20 in a similar manner. As a non-limiting example, the resources component 34 is updated to reflect changes to operation process, the training component 40 is updated to reflect the training needs of members associated with the new process, the planning component 42 is updated to generate a dynamic planning strategy reflecting the change in the operational process, the available resources, and the training status, the client touchpoints component 46 is updated to reflect changes in the updated processes and planning strategy, and the activities manager 48 is update to organize and output a dynamic calendar. It is understood that the database server 20 may be adapted to align the information of each of the interconnected components 32, 34, 36, 38, 40, 42, 44, 46, 48 as desired. It is further understood that the interconnection of the components 32, 34, 36, 38, 40, 42, 44, 46, 48 may also be modified to control the update and information alignment process.

The data management system 10 and the method for updating and aligning a plurality of management components 32, 34, 36, 38, 40, 42, 44, 46, 48 provides a customizable dynamic model for keeping critical operational and management components 32, 34, 36, 38, 40, 42, 44, 46, 48 updated and aligned as a client group evolves. The data management system 10 and the method also provide a means for improving management and operation of processes and resources of a client group from a remote location.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A data management system comprising:
    a user system having a web browser;
    a database including a plurality of management components for storing information related to a client group, the management components including:
        a processes component storing operational process information related to operations of the client group,
        a resources component storing a plurality of organizational resources,
        a people and jobs component storing information related to a plurality of job titles and a plurality of members of the client group, the members of the client group each having a specific job title associated with a role in the client group and each job title including a designated swimlane for organizing and identifying a member's responsibilities, wherein the people and jobs component is interconnected to the processes component and includes information related to each process of the processes component for which particular members are responsible, and
        a planning component that retrieves and transmits information from the management components of the database and assembles the information into a planning output; and
    a server system in communication with the user system and the database, wherein the server system includes a change management component configured to manage information stored on the database and automatically and dynamically update each of the management components when information stored on the database is modified;
    wherein the user system is configured to selectively retrieve, display, and modify the management components through the change management component and information of the people and jobs component is updated and modified by the server system when a process of the processes component is modified, the update and modification of the people and jobs component reflecting any changes to the swimlanes associated with job titles.

2. The data management system according to claim 1, wherein the user system is at least one of a computer and a mobile electronic device.

3. The data management system according to claim 1, wherein the server system is in communication with the user system and the database through at least one of a private intranet, a public internet, a local area network (LAN), a wireless network, a dial-up-connection, a cable modem, and a high speed Integrated Services Digital Network (ISDN).

4. The data management system according to claim 1, wherein the management components include at least one of a people and jobs component, a client feedback component, a training component, an activities manager component, a client touchpoints component, and an analysis and improvement component.

5. The data management system according to claim 1, wherein the server system includes a database server to manage data stored in the database and interconnections between the database and various resources not stored in the database, wherein managing the data includes processing at least one of a user query, a data transfer, a data retrieval, and a data modification.

6. The data management system according to claim 1, wherein the server system includes at least one of an application server, a web server, a fax server, a directory server, and a mail server.

7. The data management system according to claim 1, wherein the change management component is at least one of a software package, a software engine, and a programmable device.

8. An article comprising:
  a non-transitory computer read-able medium;
  a database management system in the medium for managing information stored on an interconnected database, the information including a plurality of management components including;
    a processes component storing operational process information related to operations of the client group,
    a resources component storing a plurality of organizational resources,
    a people and jobs component storing information related to a plurality of job titles and a plurality of members of the client group, the members of the client group each having a specific job title associated with a role in the client group and each job title including a designated swimlane for organizing and identifying a member's responsibilities, wherein the people and jobs component is interconnected to the processes component and includes information related to each process of the processes component for which particular members are responsible, and
  planning component that retrieves and transmits information from the management components of the database and assembles the information into a planning output; and
  an database management system in the medium for automatically and dynamically updating the management components of the database when information of the database is modified, wherein the updating means includes a change management component configured to manage information stored on the database and automatically and dynamically update each of the management components when information stored on the database is modified and information of the people and jobs component is updated and modified by the server system when a process of the processes component is modified, the update and modification of the people and jobs component reflecting any changes to the swimlanes associated with job titles.

9. The article according to claim 8, wherein the management components include at least one of a processes component, a resources component, a people and jobs component, a client feedback component, a training component, an activities manager component, a client touchpoints component, and an analysis and improvement component.

10. A method for updating and aligning a plurality of management components in real-time, the method comprising the steps of:
  providing a user system having a web browser;
  providing a database including a plurality of management components for storing information related to a client group, wherein the management components include:
    a processes component storing operational process information related to operations of the client group,
    a resources component storing a plurality of organizational resources,
    a people and jobs component storing information related to a plurality of job titles and a plurality of members of the client group, the members of the client group each having a specific job title associated with a role in the client group and each job title including a designated swimlane for organizing and identifying a member's responsibilities, wherein the people and jobs component is interconnected to the processes component and includes information related to each process of the processes component for which particular members are responsible, and
    a planning component that retrieves and transmits information from the management components of the database and assembles the information into a planning output;
  providing a server system in communication with the user system and the database, wherein the server system includes a change management component to manage information stored on the database, wherein the user system is configured to selectively retrieve, display, and modify the processes component and the resources component through the change management component;
  accessing the server system through the web browser of the user system;
  modifying the information stored on the database; and
  updating the information stored on the management components of the database automatically and dynamically in response to the modification of the information stored on the database, wherein information of the people and jobs component is updated and modified by the server system when a process of the processes component is modified, the update and modification of the people and jobs component reflecting any changes to the swimlanes associated with job titles.

11. The method according to claim 10, wherein the server system automatically updates each of the management components based upon the modification of the information stored on the database.

12. The method according to claim 10, wherein the management components include a client feedback component for generating a custom survey based upon information in the management components.

13. The method according to claim 10, wherein the management components include a training component for retrieving information from the management components of the database and assembling the information into a training output.

14. The method according to claim 10, wherein the management components include an activities manager component to retrieve information from the management components of the database and assemble the information into at least one of a calendar output, a workflow management output, and a Gantt output.

15. The method according to claim 14, wherein the analysis and improvement component is interconnected with the resources component to provide real-time analysis of a particular process or operation based upon a pre-defined standard.

16. The method according to claim 10, wherein the management components include a client touchpoints component having information related to communication with the client group.

17. The method according to claim 10, wherein the management components include an analysis and improvement component to retrieve information from the management components of the database, analyze the information based upon a pre-determined standard, and provide a plurality of utilities for streamlining the operation of the client group.

18. The method according to claim 10, wherein:
  modifying the information stored on the database includes modifying a process of the processes component; and
  updating the information stored on the management components of the database includes updating the information of the people and jobs component including changes to the swimlanes associated with job titles.

19. The method according to claim 10, wherein the management components include:
  a training component for retrieving information from the management components of the database and assembling the information into a training output; and
  an activities manager component to retrieve information from the management components of the database and assemble the information into at least one of a calendar output, a workflow management output, and a Gantt output;
  wherein the training component is interconnected with the people and jobs component for updating and identifying each of the member's training status and the activities manager component for scheduling and tracking each of the member's training.

20. The method according to claim 10, wherein accessing the server system through the web browser of the user system includes accessing the server system by more than one user from a remote location.

* * * * *